United States Patent
Diehl

[15] 3,707,022
[45] Dec. 26, 1972

[54] TIE DOWN CLAMP
[72] Inventor: Alan Diehl, 11144 Wystone Avenue, Northridge, Calif. 91324
[22] Filed: Sept. 23, 1970
[21] Appl. No.: 74,681

[52] U.S. Cl..............24/115 J, 24/129, 24/68 R, 24/197, 248/328, 188/65.5
[51] Int. Cl...........F16g 11/14, A44b 11/02
[58] Field of Search........24/71.3, 71.2, 71.1, 68 CD, 24/68 F, 68 T, 68 R, 115 J, 123 G, 193, 273, 77, 129, 200, 197; 248/328, 332; 294/82, 83, 74; 254/78; 188/65.5, 65.4, 65.2

[56] References Cited

UNITED STATES PATENTS

| 2,981,994 | 5/1961 | White | 24/200 |
| 2,238,755 | 4/1941 | Schultz | 24/200 |
| 2,769,220 | 11/1956 | Harley | 24/193 |
| 2,896,283 | 7/1959 | Huber | 24/71.1 |
| 3,131,450 | 5/1964 | Zinkel | 24/197 |
| 3,376,613 | 4/1968 | Lindblad | 24/200 |
| 3,508,302 | 4/1970 | Settanni | 268/328 |

FOREIGN PATENTS OR APPLICATIONS

| 286,602 | 2/1953 | Switzerland | 24/193 |
| 63,985 | 9/1941 | Norway | 24/200 |
| 173,709 | 3/1935 | Switzerland | 24/71.2 |
| 1,165,319 | 3/1964 | Germany | 24/200 |
| 1,394,524 | 2/1965 | France | 24/200 |

Primary Examiner—Bernard A. Gelak
Attorney—Robert E. Geauque

[57] ABSTRACT

A rope tie down clamp which employs a dual pin arrangement upon which the rope is wound, the arrangement being such that in use the tie down force being transmitted through the clamp is substantially lineal, the dual pin arrangement causing the rope to frictionally bind upon itself during use, release of the clamp being effected by movement of the clamp housing in a particular direction.

4 Claims, 4 Drawing Figures

PATENTED DEC 26 1972

3,707,022

ALAN DIEHL
INVENTOR

BY R.E. Geaugue
ATTORNEY

TIE DOWN CLAMP

BACKGROUND OF THE INVENTION

The use of ropes, straps and cables to effect retention of objects is most common. For example, tie downs are commonly used to retain loads on trucks or other types of vehicles, employed to secure objects on boats, employed to retain motorcycles on trailers or trucks, employed to tighten tent ropes, and a great many other uses. The tie down is effected as by wrapping a continuous piece of rope about the object and connecting the ends together through the tie down clamp or by connecting together the object and a single piece of rope which is connected to another portion of the object, or by connecting together different pieces of rope each of which are secured to the object. For purposes of illustration the tie down clamp of this invention will be described as being specifically used in combination with a rope. However, it is to be understood that the apparatus of this invention could be readily employed with other types of flexible tie down devices such as straps or cables.

In another example of the manner in which a tie down device can be effectively used is a winch. A winch is a device which is to effect movement of an object with respect to a fixed object. Both the winch and the tie down clamp function in the same manner in that a tautness is created within the rope through the tie down clamp which is substantially in line with the longitudinal direction of the force through the rope.

Heretofore, there have been a great number of tie down clamps used. However, many such clamps require a multitude of operations to effect employment and release of the clamp. For example, upon the rope being pulled to the desired tautness many such clamping devices require that the operator locate a locking device which will effect retention of the rope at the desired degree of tautness. In essence, it requires of the operator two separate operations to effect employment of the clamp. These two operations were pulling the rope to the desired degree of tautness and then employing of the locking device.

Another disadvantage of the commonly employed tie down clamps of the prior art has been in the releasing of the clamp. Once the operator inactivates the locking device, complete release of the rope is effected. It may be desirable in certain instances that release of the rope is to be accomplished gradually. Specifically, when the clamp is employed as a winching device, a slow release would be desirable when the object is being lowered along with the action of gravity.

It would be desirable to design a tie down clamping apparatus which can be employed with a single operation, the clamping force passing through the clamp substantially parallel to the longitudinal direction of the rope, release of the tie down clamp requiring only the single operation, the release being capable of being regulated as to time.

SUMMARY OF THE INVENTION

The clamp of this invention employs the use of two spaced apart thin plates which form a housing, with three spaced apart pin elements located between each of the thin plates. Each of the pins are fixedly located with respect to each of the plates. The third pin is to be attachable directly or by a rope to a fixed object. The rope which is to achieve the tie down is to be wound around the first and second pins so that the rope is wound upon itself about the first pin. The placement of the first pin is such with respect to the third pin that the direction of the force passing through the clamp substantially coincides with the direction of the tie down force. The second pin is located with respect to the first pin so that it is substantially 90° displaced from the direction of the clamping force. A portion of the housing formed by the spaced apart plates is formed to facilitate manual grasping thereof to effect rotation of the housing about the third pin to effect release of the clamp when desired. This release may be accomplished substantially instantaneously or may be accomplished gradually.

One of the primary features of the clamp of this invention is to provide a clamp which is extremely positive in its action and in which the retention force upon the rope increases with the clamping force.

Another feature of the clamp of this invention is to design a clamp which is extremely simple in construction, non-complex in design and can be manufactured inexpensively.

Another feature of the clamp of this invention is to provide a clamp which causes the tie down force to be transmitted through the clamp substantially in alignment with the tie down force itself.

Another feature of the clamping apparatus of this invention is to provide a clamp which can be easily and effectively released either instantaneously or gradually.

DETAILED DESCRIPTION OF THE SHOWN EMBODIMENT

Figure 1:
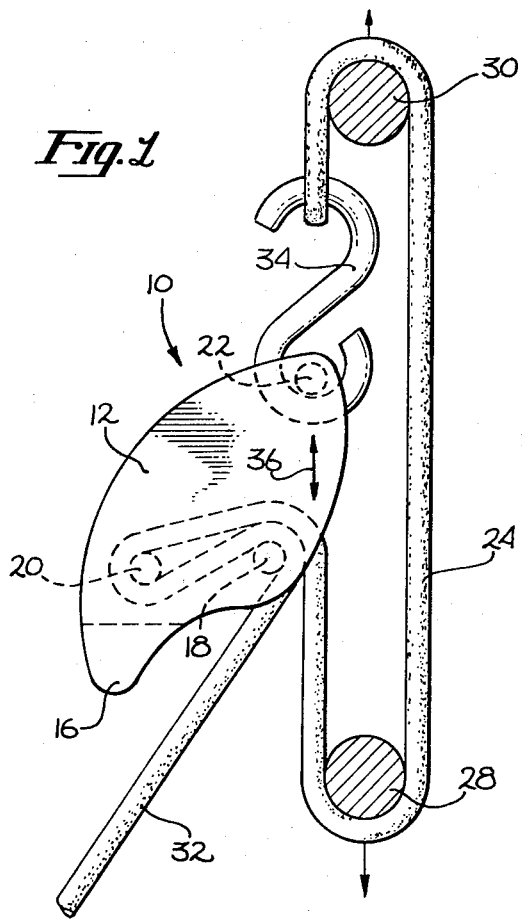
FIG. 1 is an overall view of the clamp of this invention as it would be employed with a continuous length of rope.
Figure 4:
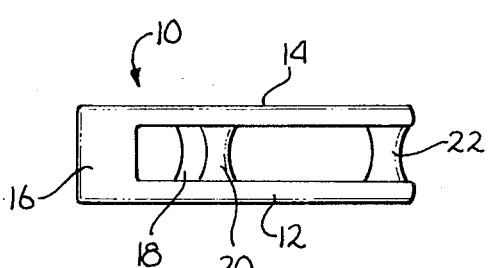
FIG. 4 is a view of the clamp housing and pin arrangement of the clamp of this invention taken in the direction of line 4—4 of FIG. 3.

Referring particularly to the drawing, there is shown in FIG. 1 the tie down clamp 10 of this invention having a housing formed of spaced apart plates 12 and 14. Each of the plates 12 and 14 are substantially identical in shape with the plates being connected together at one end thereof by a member 16. Also, a first pin 18, a second pin 20 and a third pin 22 are each fixedly secured between the plates 12 and 14 with each pin being located in a particular position. Third pin 22 is located adjacent the end of the housing furthest from member 16. Second pin 20 is located most adjacent member 16. It is to be noted that each of the pins 18, 20 and 22 are concavely curved in their longitudinal direction as shown in FIG. 4 of the drawing. Such a shaping of the pins has been found by Applicant to be desirable to facilitate cooperation thereof with a rope 24. However, it is to be considered within the scope of this invention to form the pins 18, 20 and 22 in other shapes such as being substantially cylindrical.

One end of rope 24 is to be connected to an object 28. The rope 24 may be passed around the object 28 as shown in FIG. 1 of the drawing or may be connected to the object 28 by means of a S-shaped hook 26. The object 28 may be fixedly positioned with respect to object 30 or may be movable with respect thereto if the clamp 10 was being employed as a winch.

The free end of the rope 24, which is to be referred to as the pulling end 32 is to be employed to effect the tautness within the rope 24 by creating the tie down force between objects 28 and 30. The rope 24 adjacent the pulling end 32, is wound partially around first pin 18 and is then wound around second pin 20 with the rope passing again about first pin 18 and overlying itself. In other words, about first pin 18 the rope is in frictional engagement with itself. Therefore, as the tie down force becomes greater so does the force of the frictional engagement of the segments of rope upon itself about first pin 18.

The other end of clamp 10 is secured to fixed object 30 either directly as by means of S-shaped hook 34 extending about both third pin 22 and object 30, or indirectly as by means of a rope connecting hook 34 to object 30. As shown in FIG. 1 of the drawing, the rope 24 is continuously wound about both objects 28 and 30. It is also to be considered within the scope of Applicants invention that two different segments of rope may be employed, one connected to object 28 and the other connected from hook 34 to object 30. Also, it is to be considered within the scope of this invention that objects 28 and 30 could in essence be a single mass object such as a container supported upon a bed of a vehicle.

Figure 2:
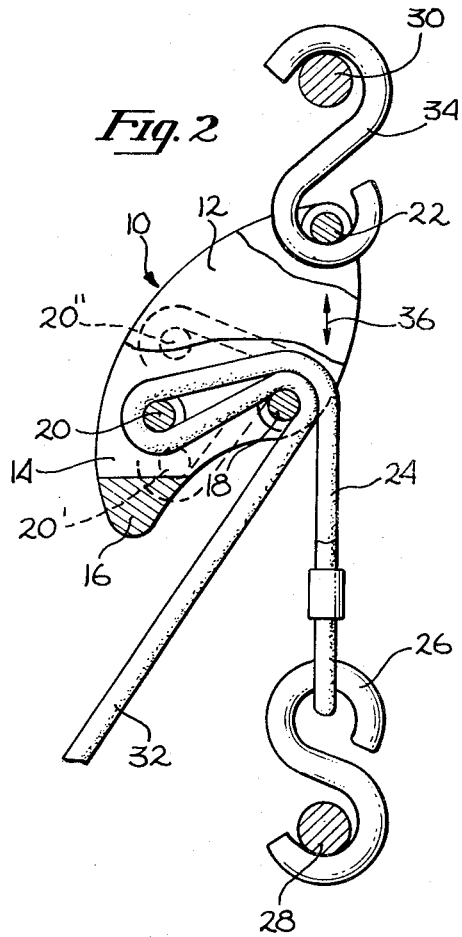
FIG. 2 is an overall view of the clamp of this invention similar to FIG. 1 but showing the clamp as it would be employed being directly attached at one end thereof to a fixed object.

The operation of the clamp 10 of this invention is as follows: For illustrative purposes, let it be assumed that the clamp 10 is to be employed as a tie down clamp upon a boat such as a sail boat. It will further be assumed that the object 28 represents the boat hull with object 30 representing some portion of the mast structure of the boat. To apply the clamp 10, clamp 10 would initially be positioned as shown in either FIG. 1 or 2 of the drawing. With clamp 10 so positioned, the operator exerts a substantial pulling force upon end 32 of the rope 24. As a result, it is moved upon first pin 18 and second pin 20 creating a tautness in the rope 24, with the tie down force passing through the housing of the clamp 10 in the direction as represented by arrow 36. The greater the force exerted upon end 32, the tighter the rope 24 becomes, with the frictional engagement of the segments of rope about first pin 18 also becoming greater. Because of the locating of second pin 20 in a direction from first pin 18 (approximately 90° angularly displaced from the direction of the tie down force 36), approximately ninety degrees of frictional contact occurs with respect to the rope upon itself about first pin 18. This length of contact is sufficient to preclude any slippage once the tie down force represented by arrow 36 has been established.

Figure 3:
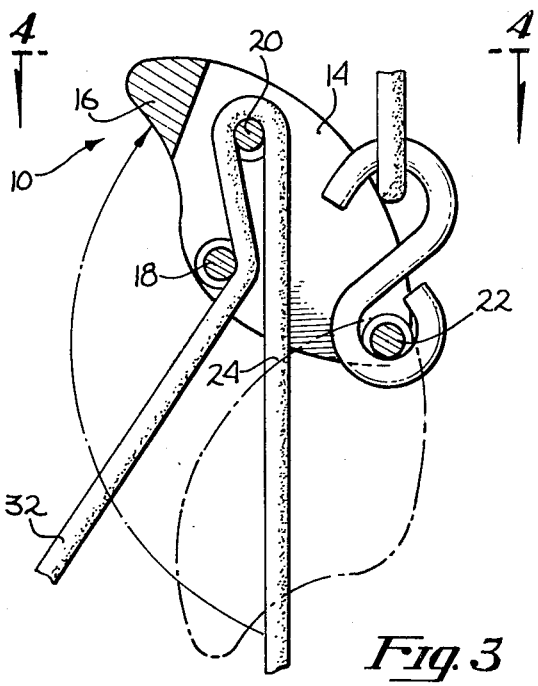
FIG. 3 is a view similar to FIG. 1 but showing the clamp in the released position.

To effect complete release of the clamp 10 (to effect substantial movement of the mast structure with respect to the hull of the boat), the human operator grasps member 16 of the clamp 10. The human operator then pivots the clamp 10 about the third pin 22 within S-shaped hook 34. As a result, the engagement of the rope 24 upon itself about first pin 18 has been eliminated as shown in FIG. 3 of the drawings, resulting in permitting slippage of the rope 24 and complete elimination of the tie down force. Another feature of the clamp 10 of this invention is to permit the human operator to slowly decrease the tie down clamping force by means of just pivoting clamp 10 a slight amount thereby initiating slippage of the rope 24 about pins 18 and 20. By such a regulating of the decrease of the tie down force, movement of the mast structure 30 with respect to the hull 28 may be effected gradually.

Numerous modifications of the clamp 10 of this invention could be readily employed. For example, if it is desired to increase the frictional engagement force about first pin 18, it would only be necessary for the second pin 20 to be located nearer member 16 as shown by numeral 20 in FIG. 2. As a result, the angle of contact between the segments of rope about first pin 18 would increase proportionately greater than the 90° position as shown in the drawing. As the amount of contact increases about first pin 18, so does the frictional engagement force. Also, if desired, the pin 20 can be positioned so the angle is less than 90° as shown by numeral 20" in FIG. 2. Such would be effected when an engagement force of smaller magnitude is desired. Further, it also may be desirable to form first pin 18 with an outer rough surface such as a serrated surface. Such a surface would insure non-slippage of the rope 24 about pin 18. It may also be desirable in certain instances to make pin 22 rotatable with respect to plates 12 and 14. Such rotation of pin 22 would be desirable in insuring correct alignment of the clamp 10 when installed. Also, pin 18 may be made to be rotatable since the locking action is achieved by the rope upon itself and not against the pin 18.

Some additional features of the clamp 10 not readily apparent from the foregoing would be that the pulling force exerted through end 32 can be from any direction within the confines of the angle between member 16 and S-shaped hook 26. Also, the release of the clamp can be readily accomplished by one hand of a person in a single quick operation, thereby leaving the operators other hand free to accomplish other tasks. Further, the release of the clamp 10 can be readily accomplished without the aid of sight and by only the use of the sense of touch. Also, there are no moving parts within the clamp 10 of this invention thereby absolutely precluding maintainence or repair of the clamp 10 after prolonged use.

Clamp could be used without open ended S hooks in an application where a great amount of slack may be in the line with the clamp and accidental disengagement of the S hooks would not be desirable. For instance, in use on a sailboat the line would be used to secure a sail or rigging which may at times leave the line slack but would hold its adjustment until the line is made taut again by some action of the sail or rigging.

What is claimed is:

1. A tie down clamp to operate between a first object and a second object, said tie down clamp comprising:
   a housing;
   a first pin fixed to said housing, a second pin fixed to said housing and spaced from said first pin, a third pin fixed to said housing and spaced from both said first pin and said second pin, said third pin being pivotally connected to said first object and located a fixed spacing relative to said first pin, the spacing of said second pin from said third pin being greater than the spacing of said first pin from said third pin, a rope to contact said first pin over a first portion of said rope and then be wound about said second pin, the free end of said rope is then conducted again about said first pin to produce a second rope portion in contact with approximately said first portion, said free end of said rope connected to said second object and the other end of said rope receiving a tie down force to be effected between said first object and said second object resulting in the rope being forced together in friction engagement with itself over said portion about said first pin; the line between said first and second pins forming a substantial acute angle with a line passing through said second and third pins.

2. A clamp as defined in claim 1 wherein:
having a member fixed to said housing adjacent said second pin for rotating said housing about the axis of said third pin.

3. A clamp as defined in claim 1 wherein:
said line located between said second pin and said first pin forming an angle of approximately 90° with the direction of said tie down force substantially defined by a line located between said third pin and said first pin with a line located between said third pin and said first pin.

4. Apparatus as defined in claim 1 wherein:
said housing comprises a pair of spaced apart plates.

* * * * *